US009651130B2

(12) United States Patent
Yulkowski

(10) Patent No.: US 9,651,130 B2
(45) Date of Patent: May 16, 2017

(54) GEAR ASSEMBLY WITH SPIRAL GEARS

(71) Applicant: TD IP HOLDCO, LLC, Waterford, MI (US)

(72) Inventor: Leon Yulkowski, Bloomfield Hills, MI (US)

(73) Assignee: TD IP HOLDCO, LLC, Waterford, MI (US)

( * ) Notice: Subject to any disclaimer, the term of this patent is extended or adjusted under 35 U.S.C. 154(b) by 0 days.

(21) Appl. No.: 14/797,565

(22) Filed: Jul. 13, 2015

(65) Prior Publication Data

US 2016/0033024 A1 Feb. 4, 2016

Related U.S. Application Data

(60) Provisional application No. 62/030,835, filed on Jul. 30, 2014.

(51) Int. Cl.
*F16H 47/02* (2006.01)
*E05F 15/53* (2015.01)
*E05F 1/00* (2006.01)
*E05F 3/10* (2006.01)
*F16H 35/00* (2006.01)

(52) U.S. Cl.
CPC .............. *F16H 47/02* (2013.01); *E05F 1/002* (2013.01); *E05F 3/102* (2013.01); *E05F 15/53* (2015.01); *F16H 2035/003* (2013.01)

(58) Field of Classification Search
CPC ............ F16H 47/02; E05F 1/002; E05F 15/53
USPC .......... 49/333, 334, 335, 339, 340, 341, 358
See application file for complete search history.

(56) References Cited

U.S. PATENT DOCUMENTS

| 3,699,717 | A | * | 10/1972 | Hedrick | 49/264 |
| 3,955,365 | A | * | 5/1976 | Arao | 60/330 |
| 3,968,651 | A | * | 7/1976 | Walworth | 60/487 |
| 4,660,250 | A | * | 4/1987 | Tillman et al. | 16/58 |
| 4,727,679 | A | * | 3/1988 | Kornbrekke | E05F 15/63 49/138 |
| 5,036,620 | A | * | 8/1991 | Beran | E05D 15/54 49/141 |
| 5,063,316 | A | * | 11/1991 | E-Ming | H01H 35/006 200/500 |

(Continued)

FOREIGN PATENT DOCUMENTS

| EP | 0 243 786 | 11/1987 |
| EP | 0 363 642 | 4/1990 |

(Continued)

OTHER PUBLICATIONS

Invitation to Pay Additional Fees and Partial International Search Report dated Nov. 10, 2015 for PCT application No. PCT/US2015/041006.

(Continued)

*Primary Examiner* — Jerry Redman
(74) *Attorney, Agent, or Firm* — Even Law Group LLC

(57) ABSTRACT

A gear assembly comprises a housing, a first gear shaft in the housing, a first spiral gear coupled to the first gear shaft in the housing, a second gear shaft in the housing, a second spiral gear coupled to the second gear shaft in the housing, and a fluid connection between a first chamber and a second chamber. The first spiral gear and the second spiral gear couple to define the first chamber and the second chamber within the housing.

24 Claims, 16 Drawing Sheets

(56) References Cited

U.S. PATENT DOCUMENTS

| | | | | |
|---|---|---|---|---|
| 5,188,193 | A | * | 2/1993 | Schroeder .................... 180/242 |
| 5,488,896 | A | * | 2/1996 | Current ........................ 92/129 |
| 5,518,461 | A | * | 5/1996 | Pfordt ........................... 475/72 |
| 5,687,507 | A | * | 11/1997 | Beran ........................... 49/340 |
| 5,881,497 | A | * | 3/1999 | Borgardt ................ E05F 15/63 49/139 |
| 6,108,975 | A | * | 8/2000 | Bailey ..................... E05F 15/63 49/334 |
| 6,334,276 | B1 | * | 1/2002 | Marin-Martinod et al. .... 49/139 |
| 6,338,693 | B1 | * | 1/2002 | Scholten ............ E05F 15/614 477/7 |
| 7,143,547 | B2 | * | 12/2006 | Liles, Jr. ................. E05F 1/105 49/340 |
| 8,381,617 | B2 | * | 2/2013 | Holt et al. ................. 74/665 R |
| 8,653,982 | B2 | * | 2/2014 | Yulkowski ............ E05F 15/40 340/540 |
| 2004/0182234 | A1 | * | 9/2004 | Busch ............................ 91/452 |
| 2008/0154467 | A1 | * | 6/2008 | Evans et al. .................... 701/52 |
| 2009/0126615 | A1 | * | 5/2009 | Strong .................. B63B 21/045 114/218 |
| 2012/0210647 | A1 | * | 8/2012 | McKibben et al. ............ 49/340 |
| 2014/0116164 | A1 | * | 5/2014 | Harris .................. A47J 43/1031 74/30 |
| 2014/0325911 | A1 | * | 11/2014 | Hass ................................ 49/31 |

FOREIGN PATENT DOCUMENTS

| | | | | |
|---|---|---|---|---|
| EP | 1418121 | A1 * | 5/2004 | ............... B64C 1/14 |
| FR | 452 468 | | 5/1913 | |
| GB | 1304713 | * | 1/1973 | |
| JP | H03-51562 | | 3/1991 | |
| WO | 2016/018649 | | 2/2016 | |

OTHER PUBLICATIONS

Definition of "Extreme pressure additive", pp. 1-2, found at en.wikipedia.org/wiki/Extreme_pressure_additive, Jun. 27, 2016.
WO PCT/US2015/041006, Mailed Jan. 19, 2016, 18 pages.

* cited by examiner ical devices to replace the human effort of pushing or pulling a door. Automated doors make entrances accessible to disabled users as well as increase the convenience for all users.

GEAR ASSEMBLY WITH SPIRAL GEARS

BACKGROUND

Door operators and door closers employ mechanical devices to replace the human effort of pushing or pulling a door. Automated doors make entrances accessible to disabled users as well as increase the convenience for all users.

Door closers are used to automatically close doors that have been manually opened. Door operators are similar to door closers but are able to both open and close doors automatically. A common door operator design combines a motor with a door closer and uses the motor to open the door and a spring to close the door. A powerful motor is typically required to overcome the force of the spring. An alternative door operator design eliminates the spring and uses a reversible motor to both open and close the door.

Door operators and door closers must comply with various local and national building codes and regulations. Local regulations may include state building codes or fire codes and may include more stringent regulations from other states, particularly California. National regulations may include building accessibility regulations required by the Americans with Disabilities Act (ADA). Doors typically must comply with force limits for actions such as opening a door, unlatching a door, setting a door in motion and swinging a door to a fully open position. For instance, a door is considered ADA-compliant when the force for opening the door does not exceed 5 pounds. The same actions may have different standards under different codes and regulations. For example, a state fire code may specify that a door unlatch when subjected to a 15 pound force, the door be set in motion when subjected to a 30 pound force and the door swing to a fully open position when subjected to a 15 pound force. The California fire code may be more stringent and may specify that a door unlatch when subjected to a 15 pound force, the door be set in motion when subjected to a 15 pound force and the door swing to a fully open position when subjected to a 15 pound force. ADA regulations may be even more stringent and may require that a door unlatch when subjected to a 5 pound force, the door be set in motion when subjected to a 5 pound force and the door swing to a fully open position when subjected to a 5 pound force.

Door operators and door closers typically include a series of gears to provide a mechanical advantage when opening or closing a door and comply with the force limits set by local and national building codes and regulations. A gear assembly may increase the output of a motor or aid in the compression or stretching of a spring to produce a more efficient door operator or door closer. Gear assemblies are often complex and include multiple gears to achieve a desired mechanical output. Including multiple gears in a gear assembly complicates the manufacturing process and increases costs. The presence of multiple gears and other mechanical components within a door operator or closer also increases the possibility of mechanical failure. There is a need for a gear assembly that is compact and uses a minimal number of gears to produce the necessary mechanical advantage required for use in a door operator or door closer.

SUMMARY

In a first aspect, the present invention is a gear assembly comprising a housing, a first gear shaft, a first spiral gear coupled to the first gear shaft, a second gear shaft, a second spiral gear coupled to the second gear shaft and a fluid connection between a first chamber and a second chamber. The first gear shaft, the first spiral gear, the second gear shaft and the second spiral gear are located in the housing. The first spiral gear and the second spiral gear couple to define the first chamber and the second chamber within the housing.

In a second aspect, the present invention is a door operator for opening and closing a door comprising a housing, a first gear shaft, a first spiral gear coupled to the first gear shaft, a second gear shaft, a second spiral gear coupled to the second gear shaft, a fluid connection between a first chamber and a second chamber and a hydraulic pump. The first gear shaft, the first spiral gear, the second gear shaft and the second spiral gear are located in the housing. The first spiral gear and the second spiral gear couple to define the first chamber and the second chamber within the housing. The hydraulic pump is in fluid connection with the first chamber and the second chamber.

In a third aspect, the present invention is a door closer for closing a door comprising a housing, a first gear shaft, a first spiral gear coupled to the first gear shaft, a second gear shaft, a second spiral gear coupled to the second gear shaft, a fluid connection between a first chamber and a second chamber and a torsion spring coupled to the second spiral gear shaft. The first gear shaft, the first spiral gear, the second gear shaft and the second spiral gear are located in the housing. The first spiral gear and the second spiral gear couple to define the first chamber and the second chamber within the housing.

In a fourth aspect, the present invention is a door assembly comprising a door and a door operator. The door operator comprises a housing, a first gear shaft, a first spiral gear coupled to the first gear shaft, a second gear shaft, a second spiral gear coupled to the second gear shaft, a fluid connection between a first chamber and a second chamber and a hydraulic pump. The first gear shaft, the first spiral gear, the second gear shaft and the second spiral gear are located in the housing. The first spiral gear and the second spiral gear couple to define the first chamber and the second chamber within the housing. The hydraulic pump is in fluid connection with the first chamber and the second chamber. The door is coupled to the first spiral gear.

In a fifth aspect, the present invention is a door assembly comprising a door and a door closer. The door closer comprises a housing, a first gear shaft, a first spiral gear coupled to the first gear shaft, a second gear shaft, a second spiral gear coupled to the second gear shaft, a fluid connection between a first chamber and a second chamber and a torsion spring coupled to the second spiral gear shaft. The first gear shaft, the first spiral gear, the second gear shaft and the second spiral gear are located in the housing. The first spiral gear and the second spiral gear couple to define the first chamber and the second chamber within the housing. The door is coupled to the first spiral gear.

In a sixth aspect, the present invention is a method of operating a door with a door operator comprising pumping a fluid into a first chamber to rotate a first spiral gear and a second spiral gear in a first direction and move the door open, and pumping the fluid into a second chamber to move the first spiral gear and the second spiral gear in a second direction, opposite the first direction, and move the door closed.

In a seventh aspect, the present invention is a method of operating a door coupled to a gear assembly comprising moving the door from a closed position to an open position such that movement of the door rotates a first spiral gear and a second spiral gear in a first direction and moves a fluid from a first chamber into a second chamber, and moving the door from the open position to the closed position such that movement of the door rotates the first spiral gear and the second spiral gear in a second direction, opposite the first direction, and moves the fluid from the second chamber into the first chamber.

In an eighth aspect, the present invention is a method of operating a door coupled to a door closer comprising moving the door from a closed position to an open position such that movement of the door rotates a first spiral gear and a second spiral gear in a first direction to compress a torsion spring, and moving the door from the open position to the closed position. Relaxation of the torsion spring rotates the first spiral gear and the second spiral gear in a second direction, opposite the first direction, to move the door from the open position to the closed position.

In a ninth aspect, the present invention is a door operator, for opening or closing a door, comprising a first gear shaft, a first spiral gear coupled to the first gear shaft, a second gear shaft, a second spiral gear coupled to the second gear shaft, and an electric motor. The first spiral gear is coupled to the second spiral gear. The electric motor is coupled to the first gear shaft.

In a tenth aspect, the present invention is a door assembly comprising a door and a door operator. The door operator comprises a first gear shaft, a first spiral gear coupled to the first gear shaft, a second gear shaft, a second spiral gear coupled to the second gear shaft, and an electric motor. The first spiral gear is coupled to the second spiral gear. The electric motor is coupled to the first gear shaft. The door is coupled to the first spiral gear.

DEFINITIONS

A "door closer" is a mechanical device that is able to close a door that has been opened. A door closer is not capable of opening a door.

A "door operator" is a mechanical device that is able to open and close a door.

A "spiral gear" is a non-circular gear in which the distance between the gear teeth and the gear axis progressively increases as the teeth are spaced around the gear such that the gear has a profile of an expanding spiral. The gear teeth do not necessarily surround the entire spiral gear. The part of a spiral gear where the teeth are present is known as a "spiral portion."

A "torsion spring" is a spring that is compressed when it is twisted. A common example of a torsion spring is a watch spring.

A "power source" means a device that supplies energy to a door operator or a door closer. Examples of power sources include electric motors and hydraulic pumps.

Two components are considered to be "substantially identical" if their dimensions vary by no more than ±0.03 inches.

BRIEF DESCRIPTION OF THE DRAWINGS

The invention can be better understood with reference to the following drawings and description. The components in the figures are not necessarily to scale, emphasis instead is placed upon illustrating the principles of the invention.

DETAILED DESCRIPTION

The present invention makes use of the discovery of a gear assembly that includes two spiral gears. The two spiral gears are contained within a housing and the coupling of the two spiral gears defines two chambers within the housing. Fluid may be contained within the housing and may move between the two chambers defined by the spiral gears. The gear assembly is smaller and less complex than traditional gear assemblies. By using fewer moving parts, the gear assembly is less expensive to produce and less prone to mechanical failure. The gear assembly may be used in a door that moves 90° or 180°.

The gear assembly may be used in a door operator or in a door closer. In a door operator, a power source, such as a hydraulic pump, may cause fluid to move between the chambers, which rotates the spiral gears and moves the door open and closed. Alternatively, a power source, such as an electric motor, may rotate the spiral gears to move the door open and closed without the use of a fluid. In a door closer, the gear assembly may be coupled to a torsion spring such that opening the door rotates the spiral gears and compresses the torsion spring. The relaxation of the torsion spring rotates the spiral gears in the opposite direction and closes the door. The compact size of the gear assembly with spiral gears allows for a single-arm door operator or door closer to be fully concealed in a door assembly. Concealing a door operator or door closer protects the device from abuse and provides an anti-ligation design.

Figure 1:
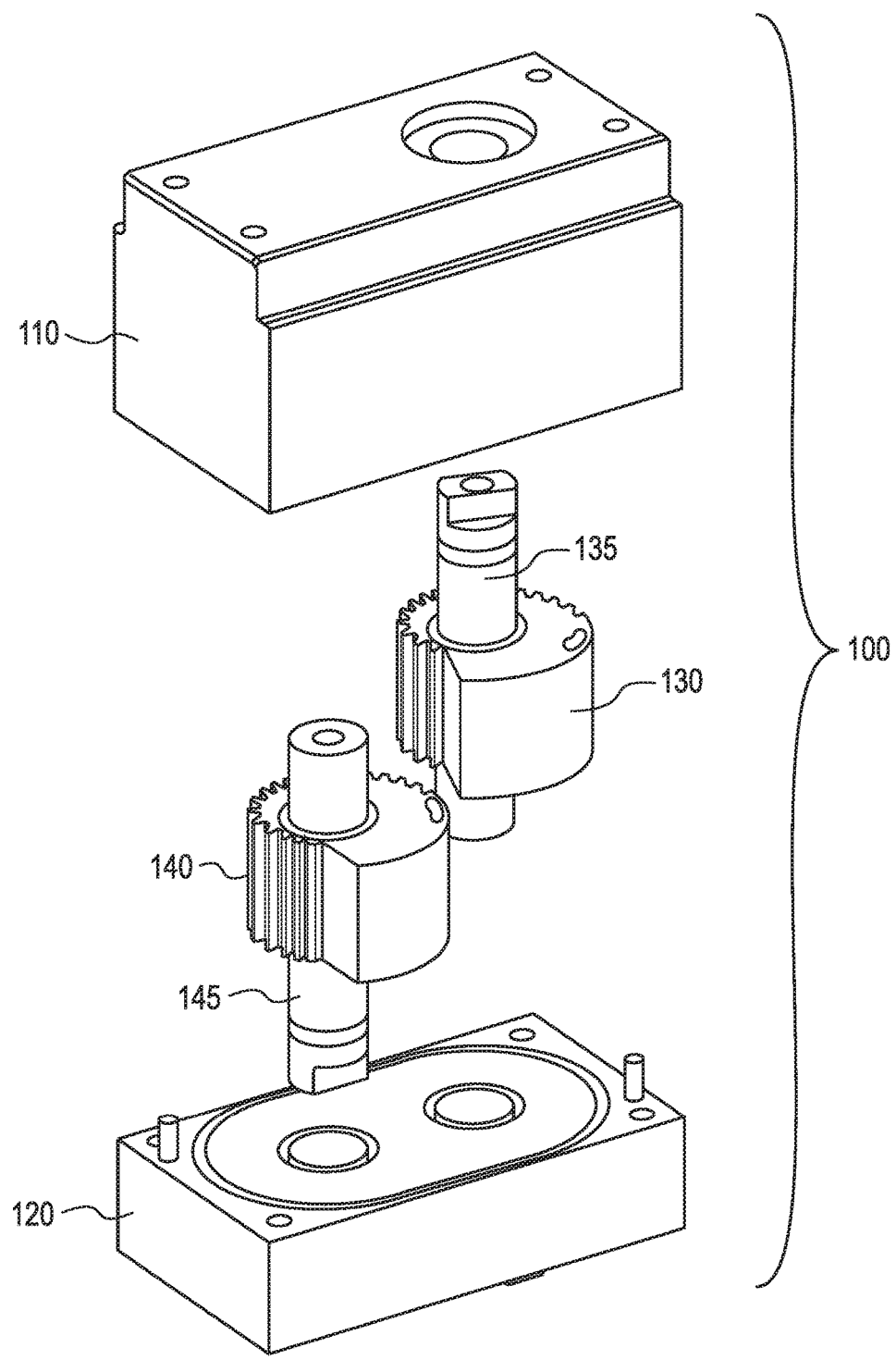
FIG. 1 shows an exploded view of a gear assembly.

FIG. 1 illustrates an exploded view of a gear assembly 100. A housing has an upper housing portion 110 and a lower housing portion 120. A first spiral gear 130 and a second spiral gear 140 are located within the housing. The first spiral gear is coupled to a first gear shaft 135 and the second spiral gear is coupled to a second gear shaft 145. The coupling of the first spiral gear and the second spiral gear to each other within the housing defines a first chamber and a second chamber within the housing. There is a fluid connection between the first chamber and the second chamber.

The housing contains the spiral gears. The housing may be constructed of any durable, rigid material such as metals, plastics, or ceramics. The housing may be composed of multiple components. Preferably, the housing is composed of two monolithic metal components, the upper housing portion and the lower housing portion.

Figure 2A:
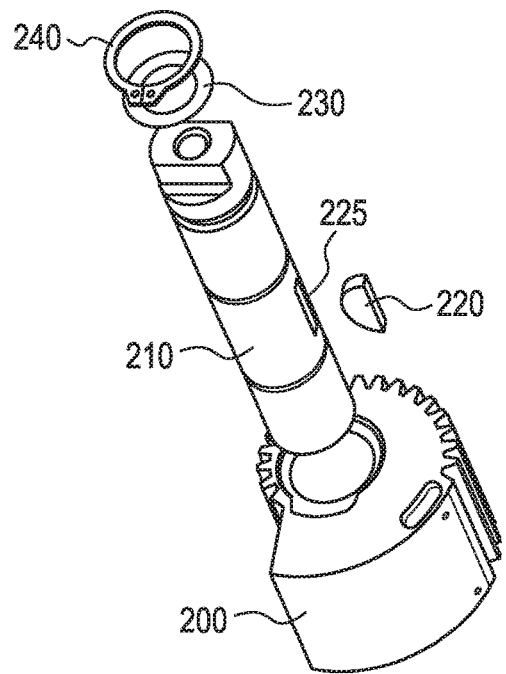
FIG. 2A shows an exploded view of a spiral gear and a gear shaft.

FIG. 2A illustrates an exploded view of a spiral gear 200 and a gear shaft 210. The spiral gear is coupled to the gear shaft. In one variation, a woodruff key 220 is coupled to the shaft and is configured to fit in the shaft keyway 225. The woodruff key prevents the spiral gear from rotating axially around the gear shaft. When the spiral gear is coupled to the gear shaft, the spiral gear covers the woodruff key. A seal 230 and a retaining ring 240 may optionally be coupled to the gear shaft.

Figure 2C:
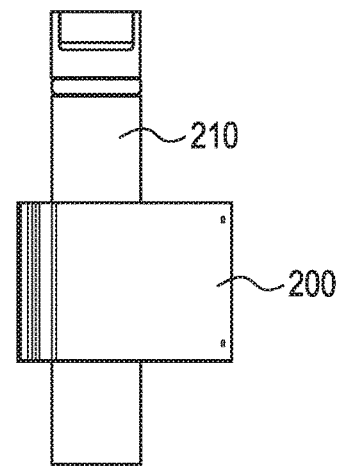
FIG. 2C shows a side view of a spiral gear and a gear shaft when coupled.
Figure 2B:
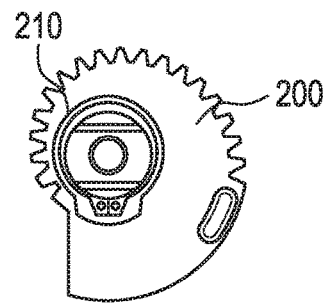
FIG. 2B shows a top view of a spiral gear and a gear shaft when coupled.
Figure 2D:
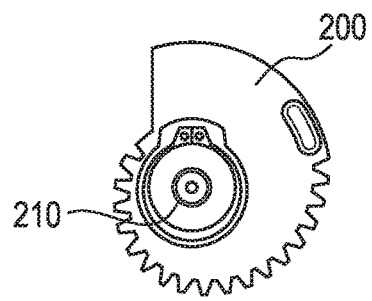
FIG. 2D shows a bottom view of a spiral gear and a gear shaft when coupled.
Figure 3A:
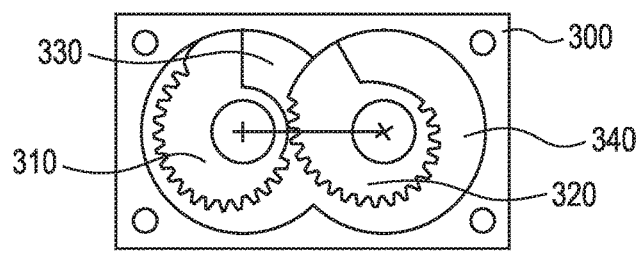
FIG. 3A shows a first illustration of two chambers that are defined by two coupled spiral gears within a housing.
Figure 3B:
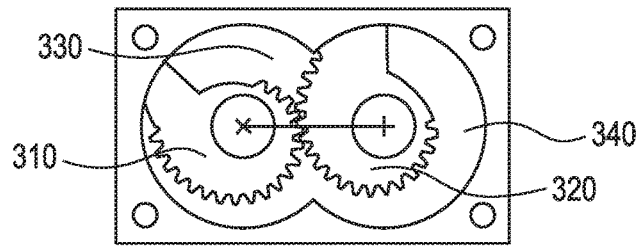
FIG. 3B shows a second illustration of two chambers that are defined by two coupled spiral gears within a housing.
Figure 3C:
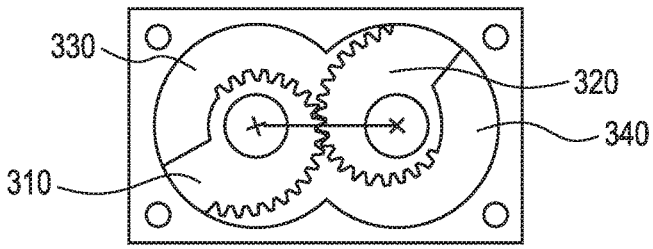
FIG. 3C shows a third illustration of two chambers that are defined by two coupled spiral gears within a housing.
Figure 3D:
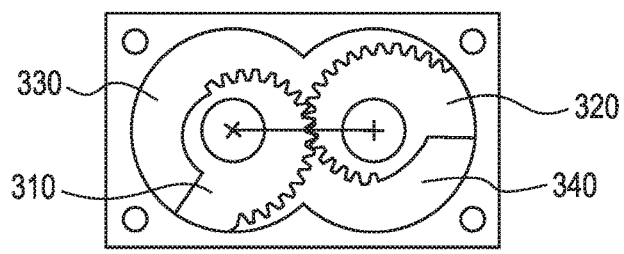
FIG. 3D shows a fourth illustration of two chambers that are defined by two coupled spiral gears within a housing.
Figure 3E:
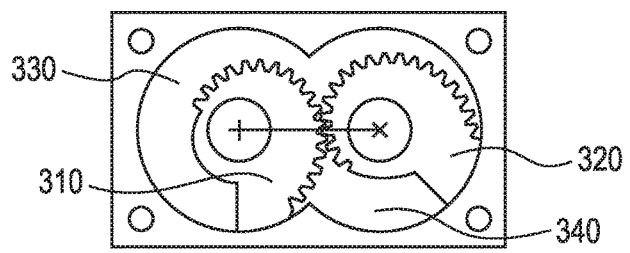
FIG. 3E shows a fifth illustration of two chambers that are defined by two coupled spiral gears within a housing.
Figure 3F:
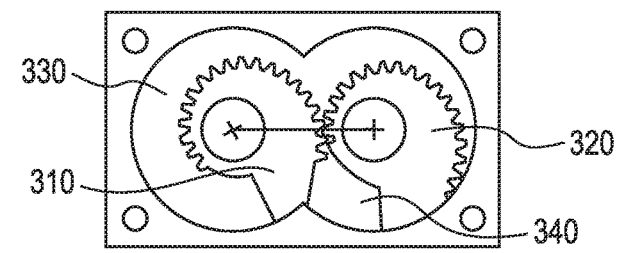
FIG. 3F shows a sixth illustration of two chambers that are defined by two coupled spiral gears within a housing.

FIGS. 2B, 2C, and 2D illustrate a top view, a side view, and a bottom view, respectively, of the spiral gear 200 and the gear shaft 210 when coupled.

The first spiral gear and the second spiral gear are sized such that the two gears fit within the housing and the coupling of the gears defines two chambers within the housing. The composition and dimensions of the spiral gears may vary as long as the spiral portions of the spiral gears are substantially identical. For example, the spiral gears may have different sizes, shapes, or weights, or may have differently sized non-spiral portions, as long as they are able to rotate within the housing and define two chambers within the housing when they are coupled. The spiral gears may be constructed of any durable, rigid material such as metals, plastics, or ceramics. The spiral gears may be monolithic or composed of multiple components. Preferably, the spiral gears are monolithic metal components.

Figure 15A:
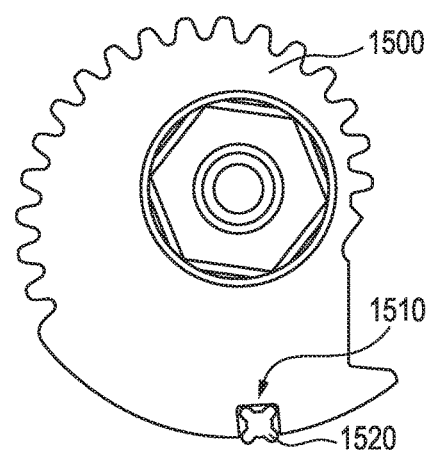
FIG. 15A shows a top view of a spiral gear with a seal.

The spiral gears may optionally include a seal. FIG. 15A illustrates a top view of a spiral gear 1500 with a seal groove 1510 and a corresponding seal 1520. The seal prevents any fluid in the housing from leaking around the spiral gear. The seal is preferably a polymer, such as natural or synthetic rubber. The seal is sized to fit in the seal groove. The seal may have any shape that allows it to fit in the seal groove. Preferably, the seal is an X-ring (also known as a QUAD-RING®).

Figure 15B:
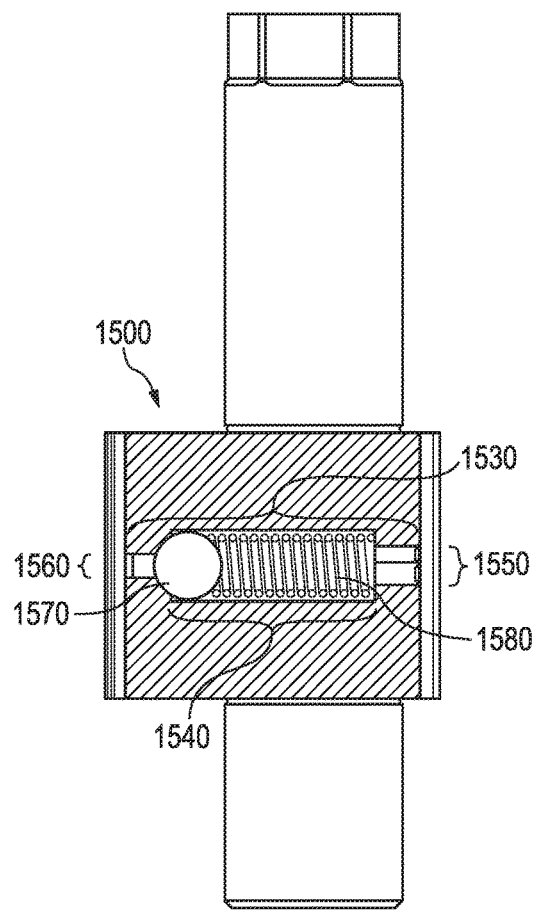
FIG. 15B shows a cut-away view of a spiral gear with a valve.

The spiral gears may optionally include a gear valve to control the opening and closing speeds of the door. The gear valve may be used to increase the opening and closing speeds and control them independently so that the door is easier or more difficult to move in a particular direction by allowing fluid to pass through the gear, from one chamber to the other chamber during opening or closing of the door. FIG. 15B illustrates a cut-away view of a spiral gear 1500 with a valve chamber 1530 and a valve 1540. The valve chamber passes through the body of the spiral gear and is defined by a first opening 1550 and a second opening 1560. The first opening is larger than the second opening. Fluid is able to pass through the valve chamber between the first chamber and second chamber within the housing. The valve may be, for example, a ball, or a ball and spring. The valve of FIG. 15B includes a ball 1570 and a spring 1580. The ball is large enough to fully block the second opening. In operation, fluid entering the valve chamber from the first opening will force the ball to seal the second opening, preventing further flow through the valve chamber. When the gear moves in the opposite direction, fluid entering the valve chamber from the second opening will flow around the ball, first compressing the spring, if present. The size of the first opening, the size of the second opening, the size of the ball and the resistance of the spring determine how fast fluid will pass through the valve chamber, and under what pressure. Optionally, a pair of spiral gears may have a ball in both valve chambers but a spring in only one of the valve chambers.

In another variation, the spiral gear and the gear shaft may be a monolithic component. A monolithic spiral gear with an integral gear shaft eliminates movement and leakage between the spiral gear and the gear shaft, obviates the need for fastening devices such as woodruff keys and is less prone to mechanical failure than a spiral gear coupled to a gear shaft. The monolithic spiral gear with an integral gear shaft may be produced, for example, by casting or by machining. The monolithic spiral gear with an integral gear shaft may be constructed of any durable, rigid material such as metals, plastics, or ceramics. Preferably, the monolithic spiral gear with an integral gear shaft is a metal component formed by casting.

Figure 14:
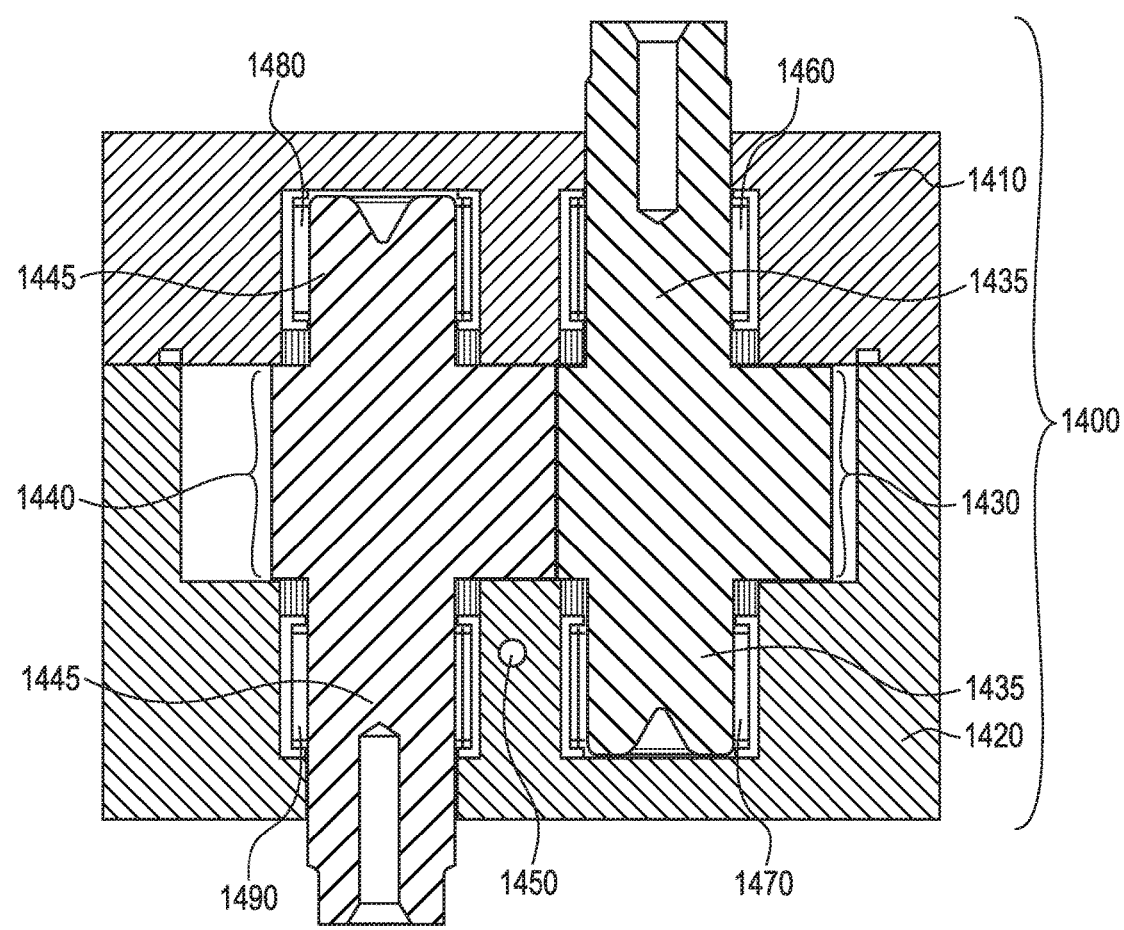
FIG. 14 shows a sectioned cut-away view of a gear assembly.

FIG. 14 illustrates a cut-away view of a gear assembly 1400. A housing has an upper housing portion 1410 and a lower housing portion 1420. A first spiral gear 1430 and a first gear shaft 1435 form a first monolithic spiral gear with an integral gear shaft in the housing. A second spiral gear 1440 and a second gear shaft 1445 form a second monolithic spiral gear with an integral gear shaft in the housing. The coupling of the first and second monolithic spiral gears with integral gear shafts to each other within the housing defines a first chamber and a second chamber within the housing. There is a fluid connection 1450 between the first chamber and the second chamber.

FIGS. 3A-3F illustrate two chambers that are defined by two coupled spiral gears within a housing 300. A first spiral gear 310 and a second spiral gear 320 couple to define a first chamber 330 and a second chamber 340. The progression of figures from FIG. 3A to FIG. 3F shows how the rotation of the spiral gears results in a change in the volumes of the first chamber and the second chamber. In FIGS. 3A to 3F, the first spiral gear rotates counterclockwise and the second spiral gear rotates clockwise within the housing. As the spiral gears rotate, the first chamber grows progressively larger in volume while the second chamber grows progressively smaller in volume.

The gear assembly may include a fluid connection between the first chamber and the second chamber. The fluid connection may be any passage between the chambers that allows fluid to travel through it, such as a pipe, channel, or conduit.

A fluid may be contained within the housing. The fluid may move between the first and second chambers that are defined by the spiral gears as the spiral gears rotate. The rotation of the spiral gears forces the fluid to move from the chamber that is reducing in volume to the chamber that is increasing in volume. The fluid may also be used to drive the spiral gears if a power source, such as a pump, is in fluid connection with the chambers. For example, pumping fluid into the smaller chamber may exert a pressure on the spiral gears and cause the gears to rotate. The fluid may be any hydraulic fluid, such as oil, synthetic oil, automobile transmission fluid, or automobile break fluid. Preferably, the fluid is oil. The fluid may optionally contain additives, for example, extreme pressure additives (also known as EP additives).

Figure 4:
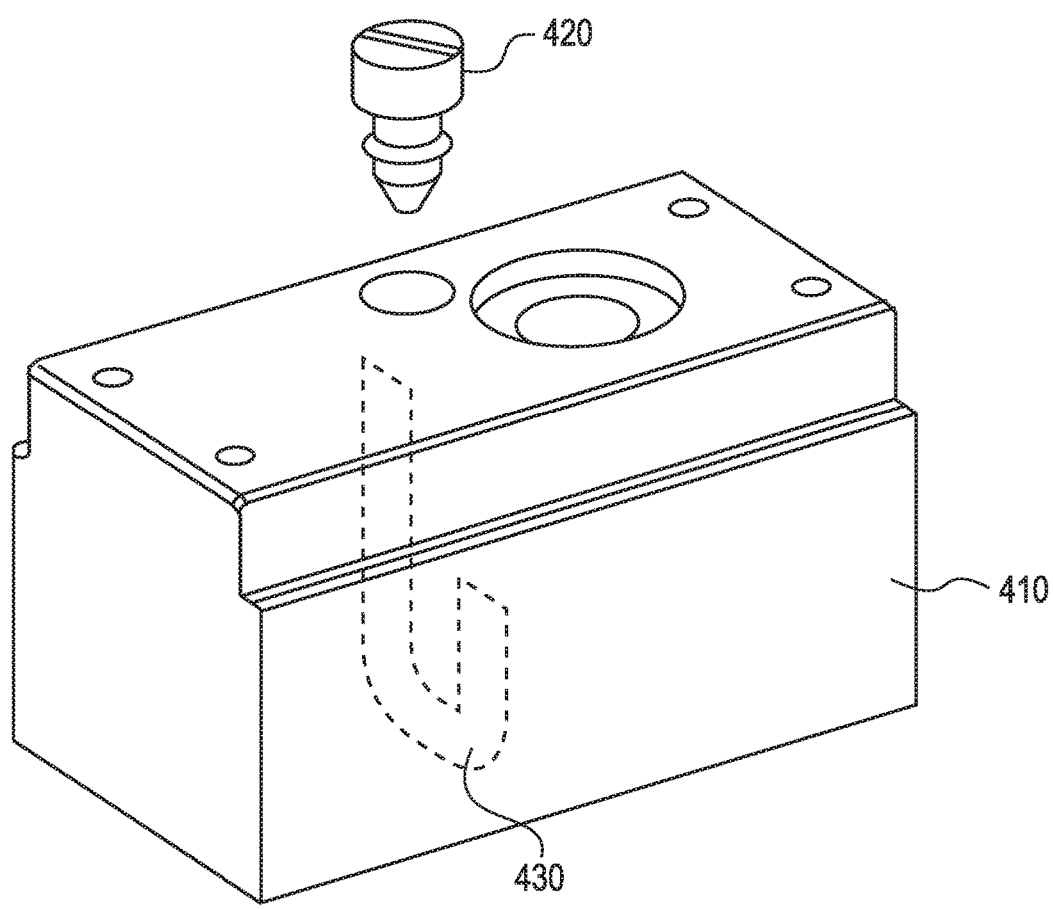
FIG. 4 shows a housing upper portion and a valve.

The gear assembly may include a fluid connection valve. FIG. 4 illustrates a housing upper portion 410 and a valve 420. There is a fluid connection 430 within the housing. In a fully-assembled gear assembly, the fluid connection fluidly connects a first chamber and a second chamber which are defined by the coupling of a first spiral gear and a second spiral gear within the housing. The valve is located along the fluid connection between the first chamber and the second chamber. The valve may be used to control the flow of fluid within the housing. Any valve design may be used, such as a ball valve, globe valve, or needle valve. The valve may be constructed of any durable, rigid material such as metals, plastics, or ceramics. The valve may be monolithic or composed of multiple components. Preferably, the valve is a monolithic metal component.

The gear assembly may optionally include bearings coupled to the gear shafts to reduce friction. Any suitable type of bearing may be used, such as a plain bearing or a rolling-element bearing. A preferred plain bearing is a bushing. A preferred rolling-element bearing is a needle roller bearing. The bearings may be coupled to one gear shaft or to both gear shafts. The bearings may be located on one side, or on both sides, of the spiral gears. The gear assembly may have multiple bearings, including, for example, 1, 2, 3, or 4 bearings. Alternatively, bearings may be eliminated by machining the gear assembly components and housing to have extremely close tolerances.

Figure 5:
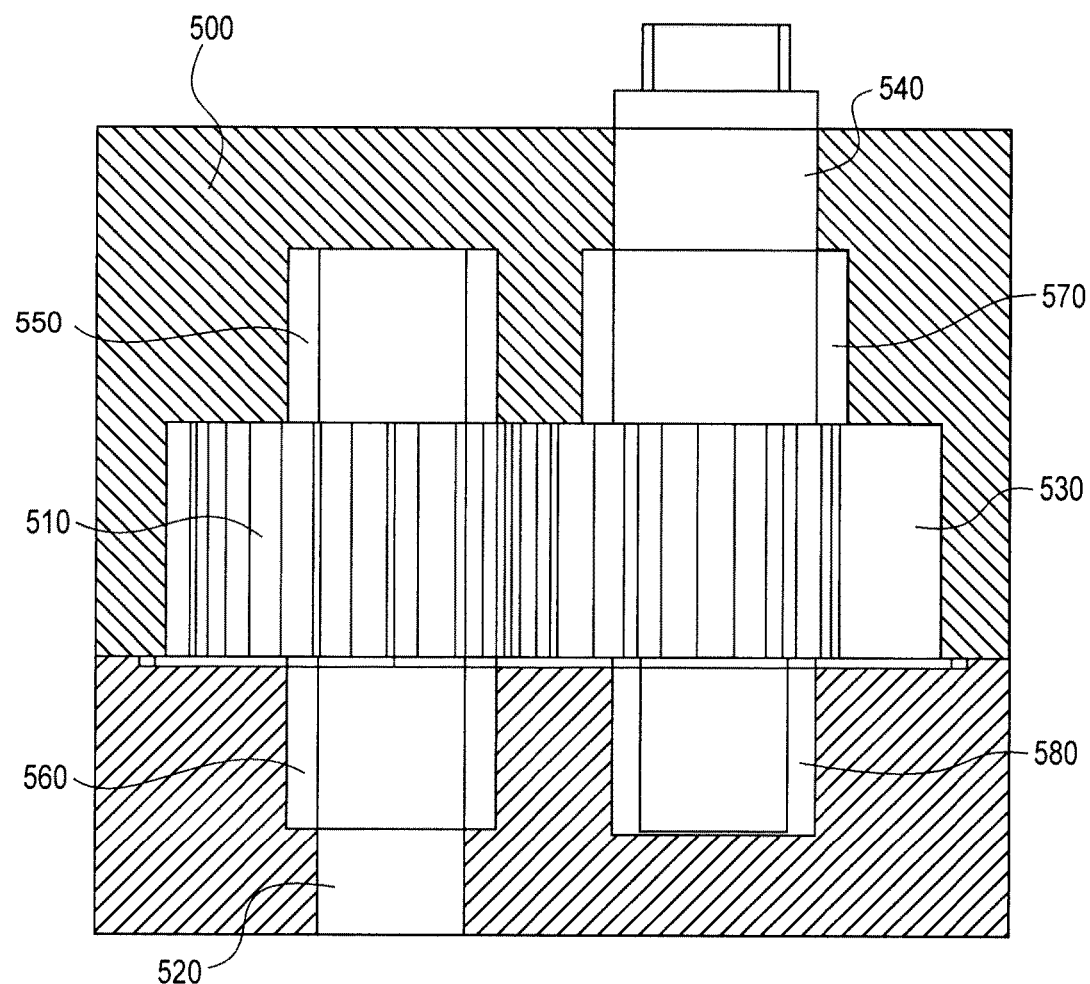
FIG. 5 shows a cut-away view of a gear assembly with needle roller bearings.

FIG. 5 illustrates a cut-away view of a gear assembly 500 with four needle roller bearings. A first spiral gear 510 is coupled to a first gear shaft 520. A second spiral gear 530 is coupled to a second gear shaft 540. A first needle roller bearing 550 is coupled to the first gear shaft above the first spiral gear. A second needle roller bearing 560 is coupled to the first gear shaft below the first spiral gear. A third needle roller bearing 570 is coupled to the second gear shaft above the second spiral gear. A fourth needle roller bearing 580 is coupled to the second gear shaft below the second spiral gear.

FIG. 14 shows a gear assembly with four bushings. A first bushing 1460 and a second bushing 1470 are coupled to the first gear shaft of the first monolithic spiral gear with an integrated gear shaft. A third bushing 1480 and a fourth bushing 1490 are coupled to the second gear shaft of the second monolithic spiral gear with an integrated gear shaft.

Figure 6:
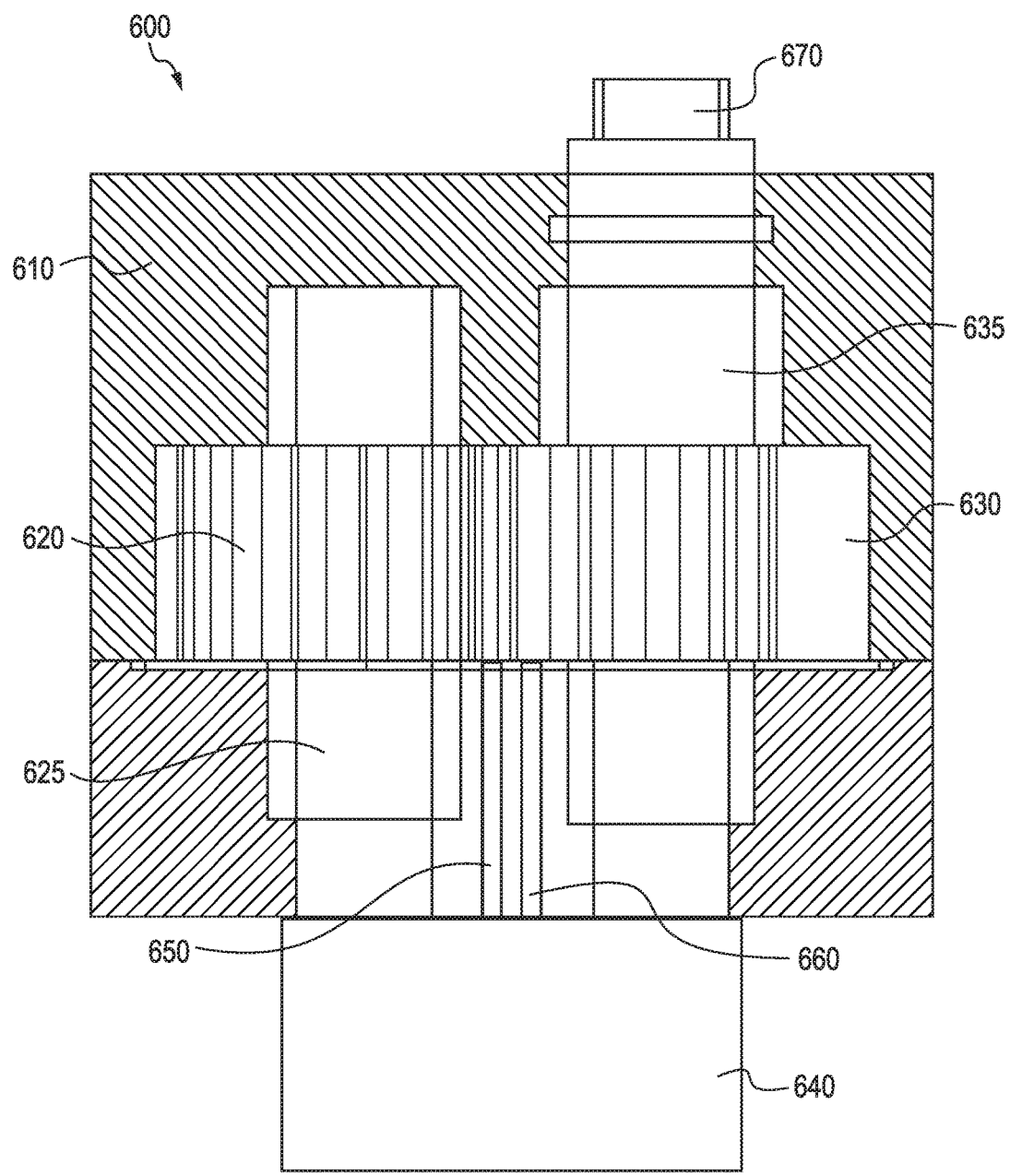
FIG. 6 shows a cut-away view of a door operator.

FIG. 6 illustrates a cut-away view of a door operator 600 for opening and closing a door. The door operator includes a housing 610. A first spiral gear 620 and a second spiral gear 630 are located within the housing. The first spiral gear is coupled to a first gear shaft 625 and the second spiral gear is coupled to a second gear shaft 635. The coupling of the first spiral gear and the second spiral gear defines a first chamber and a second chamber within the housing. There is a fluid connection between the first chamber and the second chamber. A hydraulic pump 640 is fluidly connected to a first fluid channel 650 and to a second fluid channel 660. The first fluid channel is in fluid connection with the first chamber and the second fluid channel is in fluid connection with the second chamber. The door operator may be coupled to a door and may be used to move the door from a closed position to an open position, and from an open position to a closed position. The hydraulic pump may cause fluid to move between the chambers through the fluid connection, which rotates the spiral gears and moves the door.

The door operator may include an output shaft. FIG. 6 shows an output shaft 670 coupled to the second gear shaft 635. The output shaft may be coupled to either gear shaft and is also coupled to the door. The movement of the output shaft results in movement of the door. The output shaft may have any design or configuration that allows it to be coupled to the door and the gear shaft. Preferably, the output shaft is a monolithic metal component.

Figure 7:
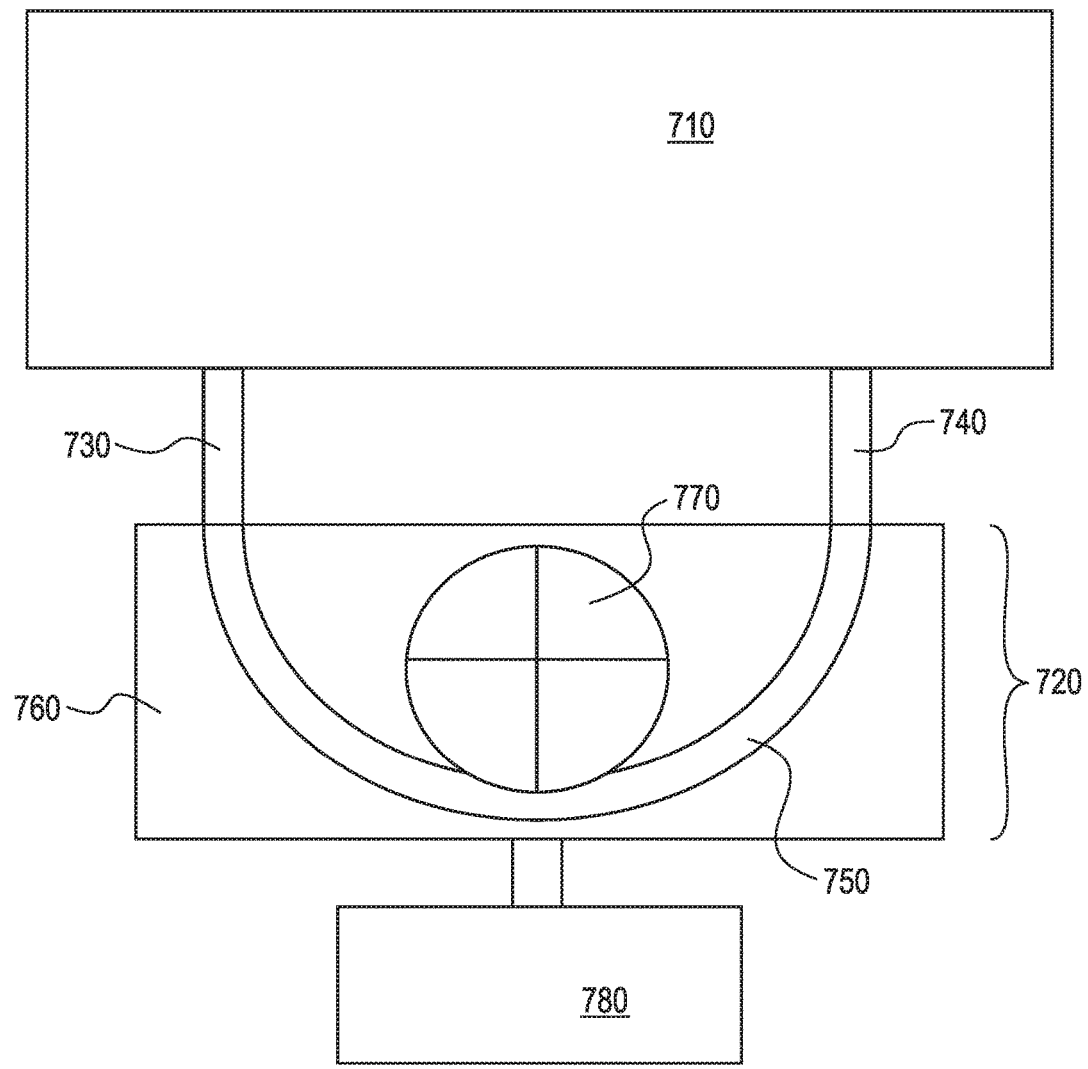
FIG. 7 shows a cut-away view of a door operator fluidly connected to a hydraulic pump.

FIG. 7 illustrates a cut-away view of a door operator 710 fluidly connected to a pump 720. A first fluid channel 730 is fluidly connected to a first chamber within the door operator. A second fluid channel 740 is fluidly connected to a second chamber within the door operator. The first fluid channel and the second fluid channel are both fluidly connected to a pumping channel 750 located within a pump housing 760. A pumping member 770 is also located within the pump housing and is coupled to the pumping channel such that the pumping member is capable of moving fluid in either direction along the pumping channel. A motor 780 is coupled to the pump and is used to drive the pump.

The hydraulic pump may be any type of pump, such as, for example, a gear pump, a rotary vane pump, or a peristaltic pump. The specific type of pump will depend on the desired pump output and the fluid within the door operator. Preferably the pump is compact. The pump must be able to move fluid from the first chamber into the second chamber and from the second chamber into the first chamber.

In an alternative variation, the power source of a door operator may be an electric motor. The electric motor may rotate the spiral gears in a first direction to open the door, and may rotate the spiral gears in a second direction, opposite the first direction, to close the door. The electric motor may optionally be coupled to a gear train. One advantage to using an electric motor for the power source is that the spiral gears may be driven directly by the motor without the use of a fluid. Eliminating the fluid also eliminates the need for a fluid connection, fluid connection valve, and/or a housing, which greatly simplifies the design. Another advantage to using an electric motor as the power source is that the motor can be very precisely controlled.

Figure 16:
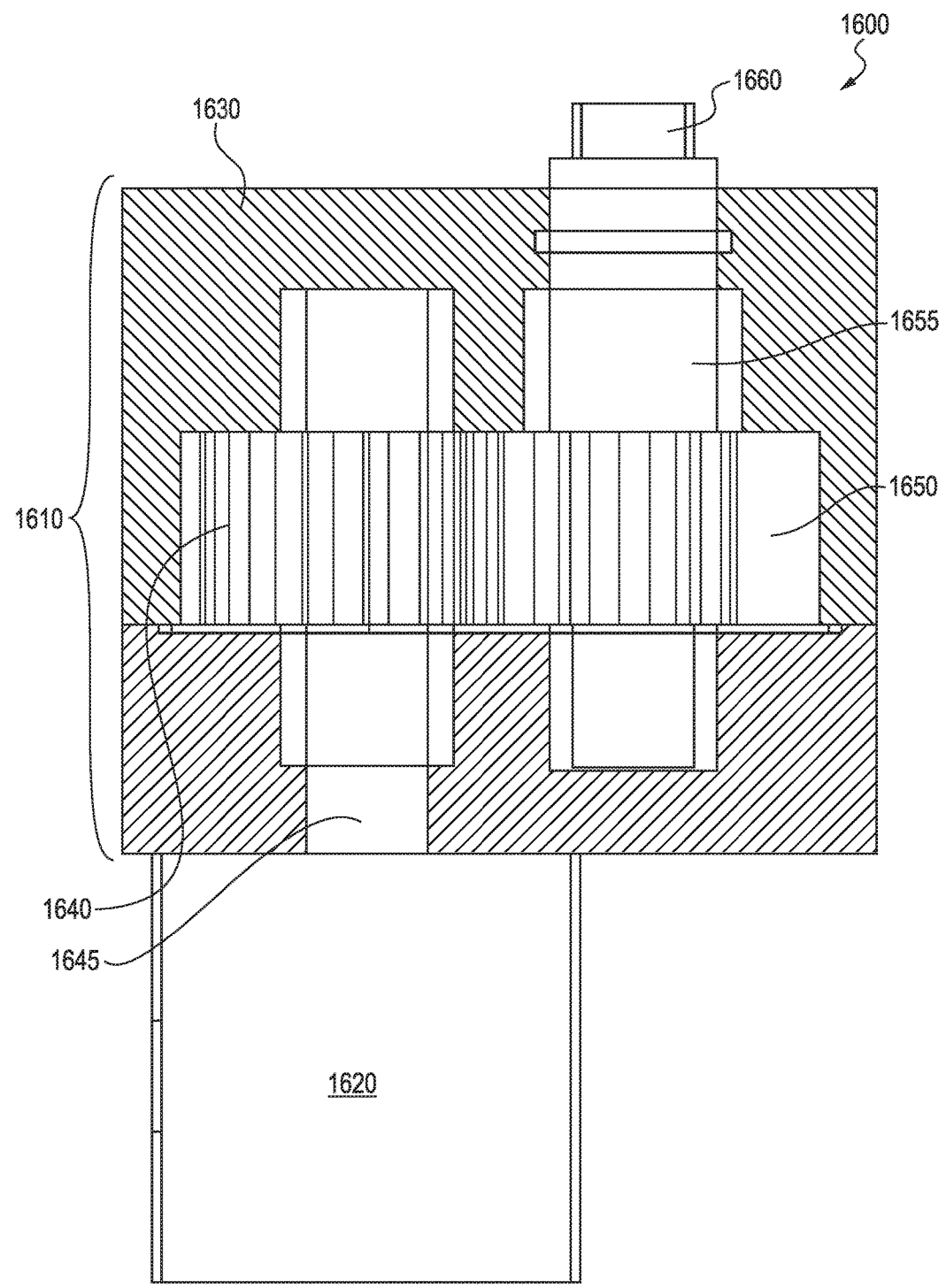
FIG. 16 shows a cut-away view of a door operator having a gear assembly with spiral gears coupled to an electric motor.

FIG. 16 illustrates a cut-away view of a door operator 1600 having a gear assembly with spiral gears 1610 coupled to an electric motor 1620. The gear assembly is contained within an optional housing 1630. The gear assembly includes a first spiral gear 1640 coupled to a first gear shaft 1645 and a second spiral gear 1650 coupled to a second gear shaft 1655. The first spiral gear and the second spiral gear are coupled to each other. The electric motor is coupled to the first gear shaft. The second gear shaft is coupled to an output shaft 1660. The output shaft may be coupled to a door (not shown).

Figure 8:
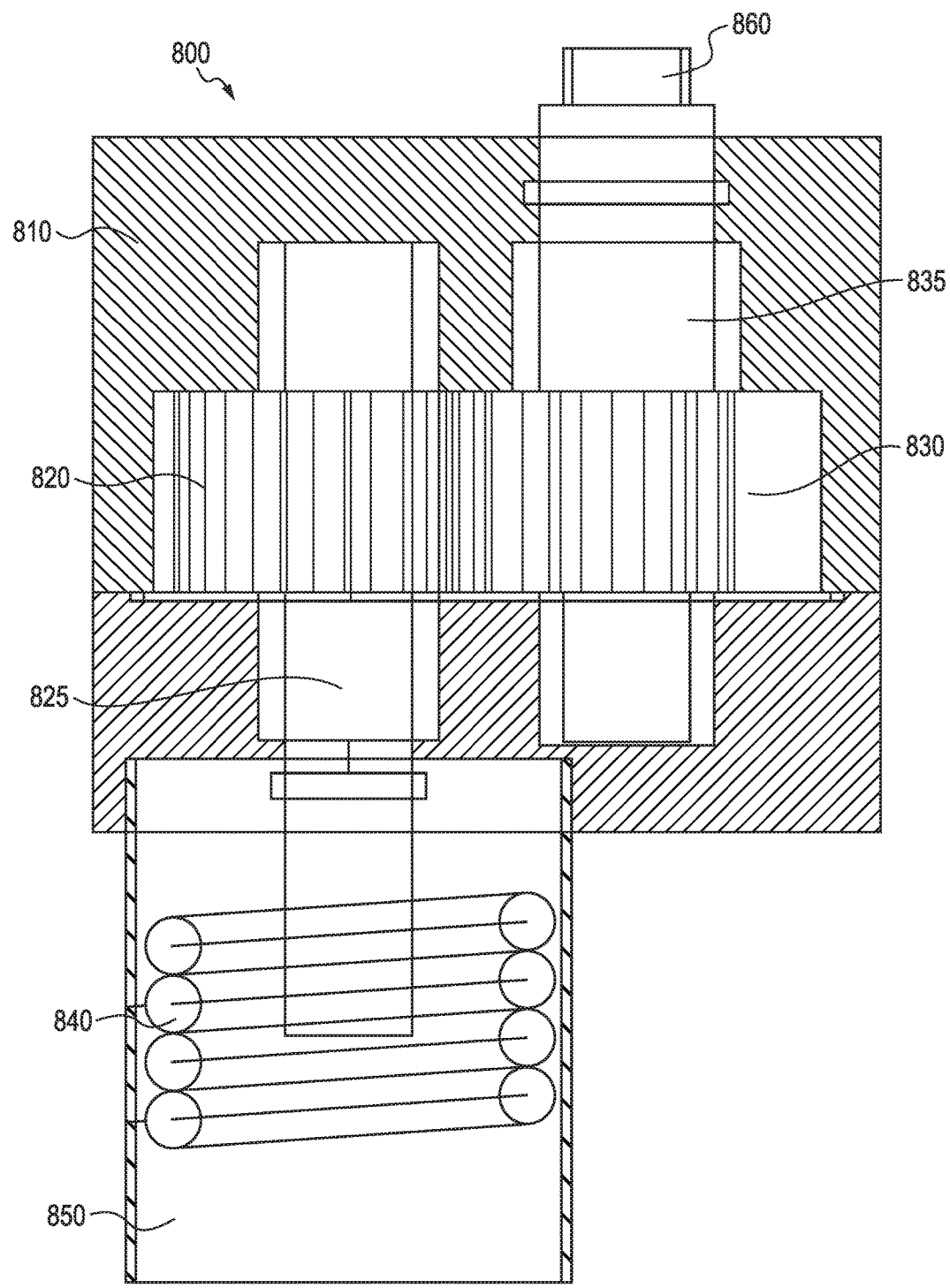
FIG. 8 shows a cut-away view of a door closer.

FIG. 8 illustrates a cut-away view of a door closer 800 for closing a door. The door closer includes a housing 810. A first spiral gear 820 and a second spiral gear 830 are located within the housing. The first spiral gear is coupled to a first gear shaft 825 and the second spiral gear is coupled to a second gear shaft 835. The coupling of the first spiral gear and the second spiral gear defines a first chamber and a second chamber within the housing. There is a fluid connection between the first chamber and the second chamber. A torsion spring 840 is located within a spring housing 850. The torsion spring is coupled to the first gear shaft. The door closer may be coupled to a door such that opening the door causes the spiral gears to rotate. The rotation of the gears causes a corresponding rotation of the gear shaft, which provides the twisting motion to compress the torsion spring. The relaxation of the torsion spring rotates the gear shaft and the spiral gears in the opposite direction, closing the door.

The specific characteristics of the torsion spring such as material, length, winding direction, number of coils, coil diameter, and pitch are selected based on the desired spring compression and relaxation properties. For example, the spring may be a steel wire with a 3/16 inch diameter and a 1.4 inch diameter coil. The torsion spring may be coupled to either gear shaft. Preferably, the torsion spring is a monolithic metal component.

The door closer may include an output shaft. FIG. 8 shows an output shaft 860 coupled to the second gear shaft 835. The output shaft may be coupled to either gear shaft and is also coupled to the door. Preferably, the output shaft is coupled to the gear shaft that is not also coupled to the torsion spring. The movement of the output shaft results in movement of the door. The output shaft may have any design or configuration that allows it to be coupled to the door and the gear shaft. Preferably, the output shaft is a monolithic metal component.

The door closer may include fluid within the housing and the spring housing. As the spiral gears rotate, the fluid is moved from the chamber that is decreasing in volume to the chamber that is increasing in volume by passing through the fluid connection. The fluid may be used to affect the speed at which the door closes based on the movement of the fluid through the fluid connection. For example, a high viscosity fluid may move slowly through the fluid connection and may be chosen to increase the time it takes for the door to close.

Figure 13:
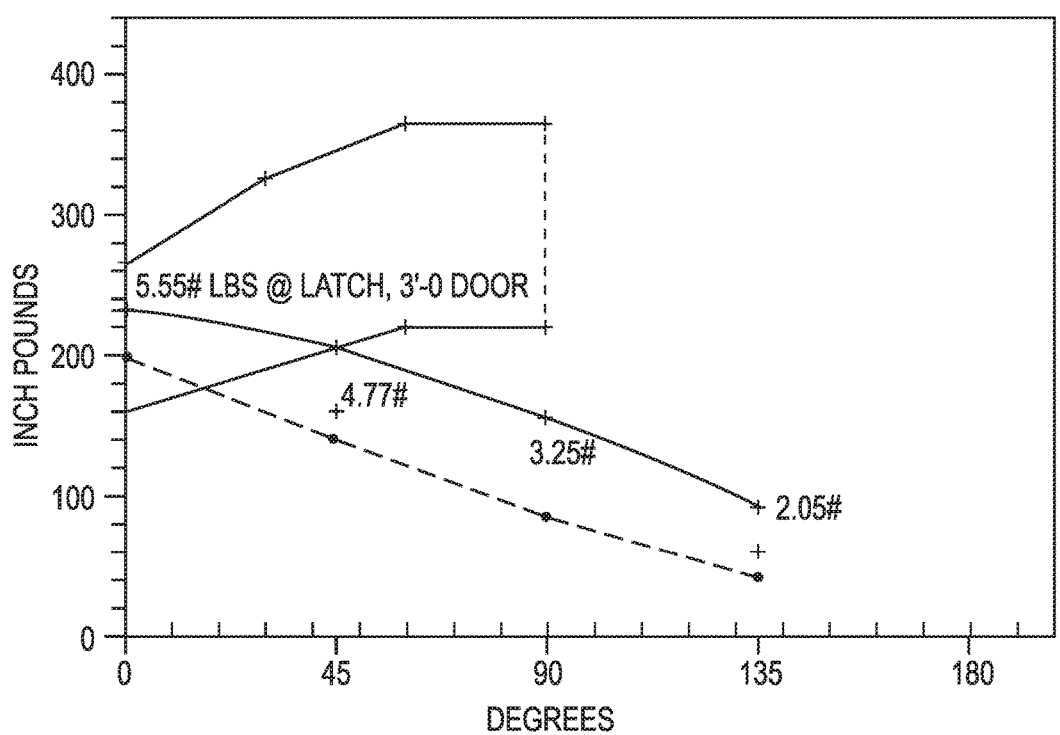
FIG. 13 shows a graph illustrating the efficiency of two door closer designs.

Incorporating the gear assembly with spiral gears in a door closer produces a door closer that is more efficient than existing door closers. The efficiency of a door closer is determined by comparing the force needed to open a door with the force needed to close the door. The efficiency may be calculated graphically by measuring the area under the curve for the door opening force and subtracting the area under the curve for the door closing force. A large difference between the opening force and closing force corresponds to a low efficiency. FIG. 13 shows a graph of force versus degrees of movement (0 degrees indicates a closed door and 180 degrees indicates an open door) for a standard door closer with a spring (upper curves) and a door closer that includes a gear assembly with spiral gears (lower curves). The standard door closer has an efficiency of approximately 55% while the door closer including a gear assembly with spiral gears has a significantly higher efficiency.

A door closer that includes a gear assembly with spiral gears has a more desirable force profile than a standard door closer with a spring. In a standard door closer with a spring, the forces increase as the door is opened and have a minimum when the door is shut. The graph illustrates this behavior in the upward slope of the upper curves. This force profile reflects the forces experienced when compressing a spring and allowing it to relax. By contrast, a door closer that includes a gear assembly with spiral gears exhibits a decrease in force as the door is opened and has a maximum force when the door is closed. This force profile is shown in the downward slope of the lower curves in the graph. A door closer that experiences the greatest force when the door is closed ensures that the door closer provides reliable latching pressure. In addition, a decreasing force curve indicates that a door becomes easier to move as it is opened while an increasing force curve indicates that a door becomes more difficult to move as it is opened. This is significant since door closers are manually opened by users. A door closer that includes a gear assembly with spiral gears is thus more efficient, provides better latching pressure and is easier to move than standard door closers.

Figure 9:
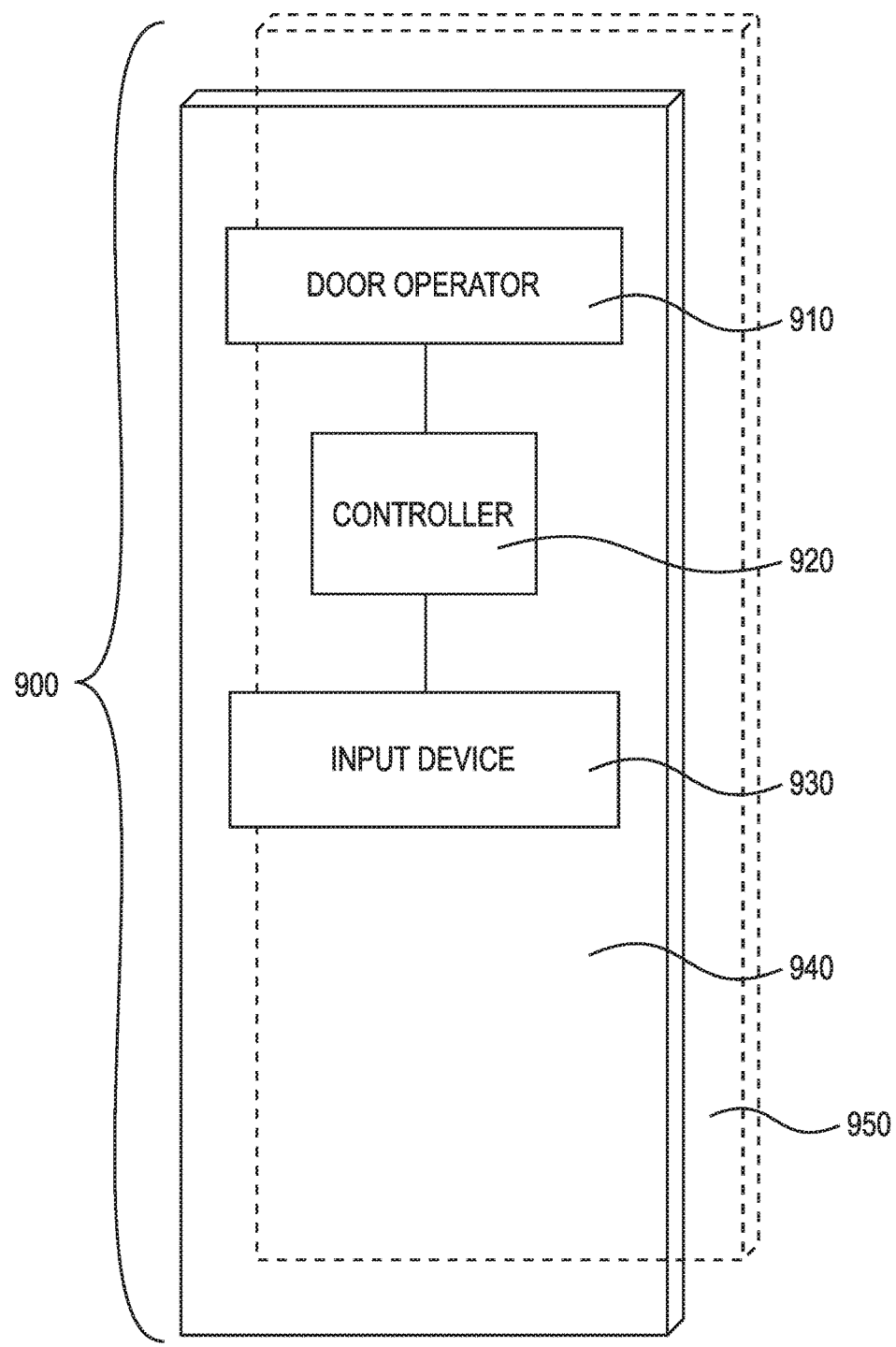
FIG. 9 shows an exploded view of a door with a door operator, a controller and an input device.

FIG. 9 illustrates an exploded view of a door 900 with a door operator 910, a controller 920, and an input device 930. The door may be constructed, for example, of metal, wood, or composite materials and may be solid or hollow. The door may be monolithic or composed of multiple pieces, such as multiple outer faces known as "door skins." The door of FIG. 9 is composed of a first outer face 940 and a second outer face 950. The interior space between the door skins may be filled with various materials, such as spacers or fire resistant materials. The door operator may be attached to the outside of the door or may be located inside the door between first and second door skins.

The door operator may include a controller to control various actions or outputs based upon various inputs. The controller may be a microprocessor in electrical communication with the power source that generates appropriate signals to open or close the door. The controller receives information from an input device to determine when to open the door. The input device may be a manually operated input device such as a button, push pad, or wall switch. The input device may also be automatically operated by the physical proximity of the user. Automatic input devices include devices such as motion sensors, floor mats with integrated pressure sensors, infrared sensors, radio frequency sensors, or photoelectric cells. A signal from the input device causes the controller to signal the power source to rotate the spiral gears in a first direction and open the door. The controller then directs a signal to the power source to rotate the spiral gears in a second direction, opposite the first direction, and close the door.

The controller provides a safety mechanism to prevent the door from continuing to move when it encounters resistance. The controller may be programmed to determine when the door has encountered an obstruction. An obstruction may be detected based on the position of the door, the time it takes for the door to open or close, or data supplied by the input device. For example, the controller may detect when the door remains open longer than a specified period of time. If the door normally returns to a closed position in 3 seconds, the controller may be programmed to interpret that when the door does not close within 3 seconds, the door has encountered an obstruction. When the controller detects an obstruction, it signals the power source to stop moving the door. The controller may then direct the power source to move the door in the opposite direction to prevent further contact with the obstruction.

Figure 10:
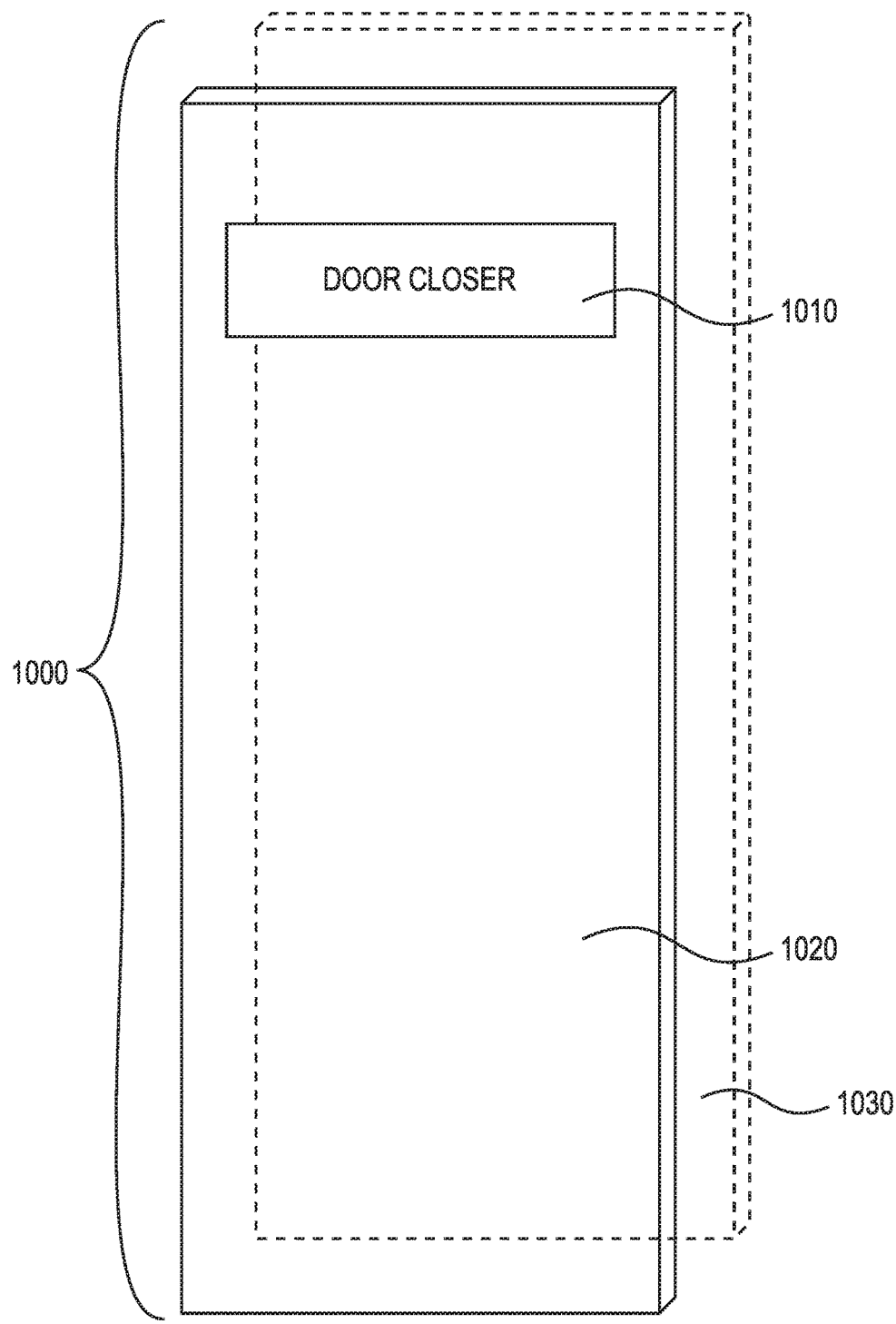
FIG. 10 shows an exploded view of a door with a door closer.

FIG. 10 illustrates an exploded view of a door 1000 with a door closer 1010. The door may be constructed, for example, of metal, wood, or composite materials and may be solid or hollow. The door may be monolithic or composed of multiple pieces, such as multiple outer faces known as "door skins." The door of FIG. 10 is composed of a first outer face 1020 and a second outer face 1030. The interior space between the door skins may be filled with various materials, such as spacers or fire resistant materials. The door closer may be attached to the outside of the door or may be located inside the door between first and second door skins.

In a door closer, the door may be opened manually and closed automatically. A door closer is significantly less complex than a door operator because the door does not need to be opened automatically. A comparison of FIG. 9 and FIG. 10 shows that the combination of a door and door closer in FIG. 10 does not include a controller or an input device. Door closers also do not require any electrical components such as pumps or motors, which greatly reduces operating costs.

Figure 11:
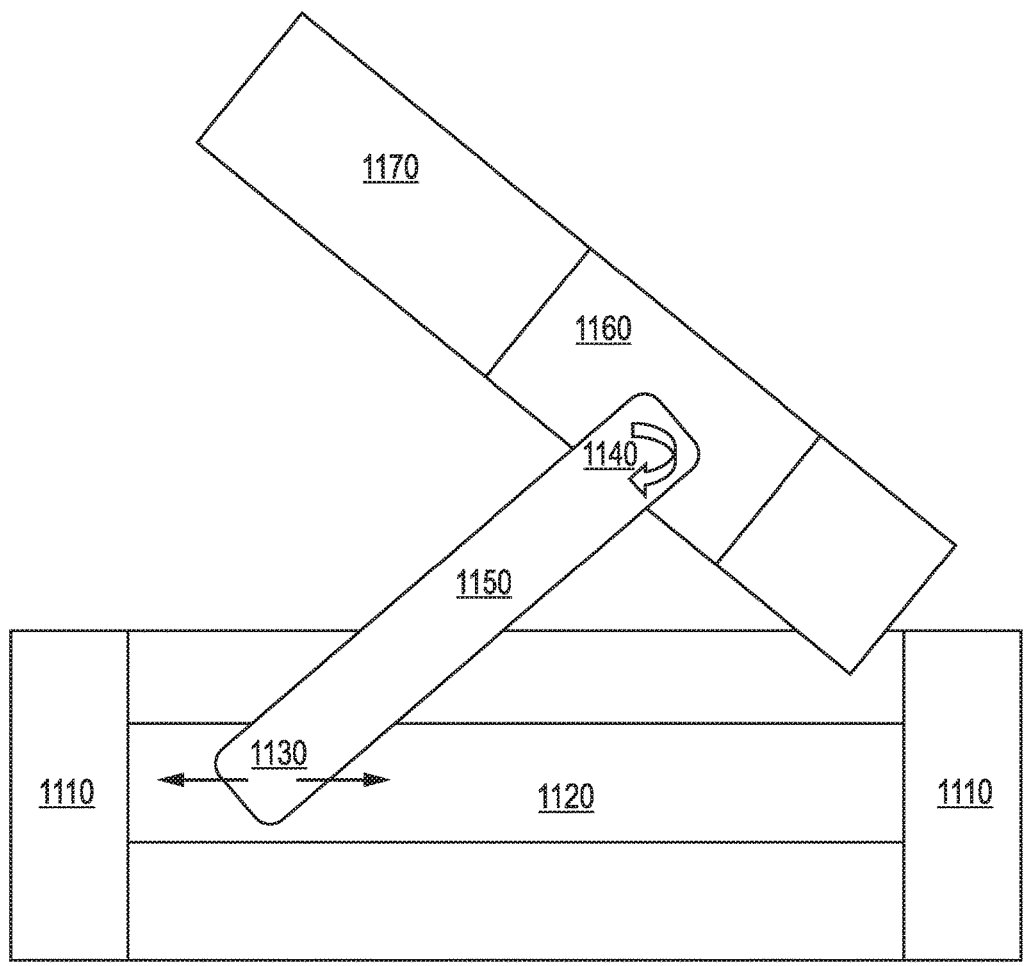
FIG. 11 shows a top view of a door assembly including a door and door operator with a hydraulic pump within a door frame.

FIG. 11 illustrates a top view of a door assembly including a door and door operator with a power source within a door frame. The door operator may be the door operator shown in FIG. 6. The frame 1110 is attached to a wall (not shown). The frame includes a track 1120 that allows a first end 1130 of an output arm 1150 to slide along the track in the direction of the arrows. A second end 1140 of the output arm is coupled to an output shaft (not shown), which is coupled to the door operator 1160. The door operator is coupled to the door 1170. When the door operator is activated, the power source delivers motion to move fluid from the first chamber through the fluid connection and into the second chamber. Movement of the fluid causes the spiral gears to rotate. The output shaft is coupled to the first gear shaft and rotation of the spiral gear causes the output shaft to rotate. The output shaft rotates the second end of the output arm in the direction indicated by the curved arrow which causes the first end of the output arm to slide along the track, moving the door open. When the power source moves fluid from the second chamber into the first chamber, the gears are rotated in the opposite direction. Rotation of the second end of the output arm in the opposite direction causes the first end of the output arm to slide in the opposite direction along the track, moving the door closed.

A door assembly may include a door and a door closer with a torsion spring. The door assembly shown in FIG. 11 would be suitable for a door assembly including a door closer within the door frame. If the door assembly shown in FIG. 11 were modified to include a door closer instead of a door operator, the door closer would take the place of the door operator 1160 but the other components would remain the same. The door closer may be the door closer shown in FIG. 8. When a door assembly includes a door closer, the door is opened manually by a user. Moving the door open causes a corresponding movement of the output arm along the track. The output arm is coupled to the output shaft, which is coupled to the first gear shaft of the door closer. As the door is opened, the first gear shaft is rotated, which causes the first spiral gear to rotate. Rotation of the first spiral gear forces fluid to move from the first chamber through the fluid connection and into the second chamber, and causes a corresponding rotation of the second spiral gear. The rotation of the second spiral gear causes the second gear shaft to rotate. The second gear shaft is coupled to the torsion spring and rotation of the second gear shaft compresses the torsion spring. When the user releases the door, the torsion spring relaxes and returns to its original state. The relaxation of the torsion spring causes the second gear shaft to rotate in a direction opposite the direction it rotated when the door was opened. Rotation of the second gear shaft causes the second gear to also rotate, which moves the fluid from the second chamber through the fluid connection and into the first chamber. Movement of the fluid rotates the first gear, which rotates the first gear shaft. The rotation of the first gear shaft causes the output shaft to move the output arm along the track to its initial location and close the door.

Figure 12:
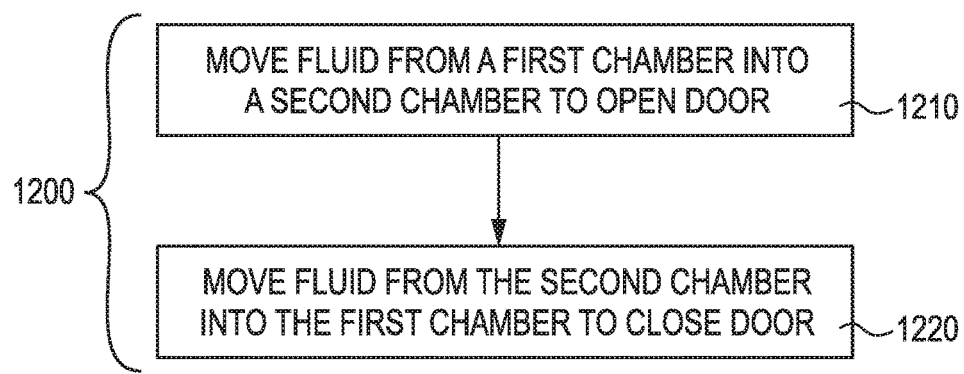
FIG. 12 shows a method of operating a door with a door operator.

FIG. 12 illustrates a method of operating a door with a door operator 1200. First, fluid is moved from a first chamber into a second chamber, to rotate a first spiral gear and a second spiral gear in a first direction and move the door open at 1210. Next, fluid is moved from the second chamber into the first chamber, to move the first spiral gear and the second spiral gear in a second direction, opposite the first direction, and move the door closed at 1220.

What is claimed is:

1. A door closer, for closing a door, comprising:
   a housing,
   a first gear shaft, in the housing,
   a first spiral gear coupled to the first gear shaft, in the housing,
   a second gear shaft, in the housing,
   a second spiral gear coupled to the second gear shaft, in the housing,
   a fluid connection between a first chamber and a second chamber, and
   a torsion spring, coupled to the second spiral gear shaft,
   wherein the first spiral gear and the second spiral gear are coupled to define the first chamber and the second chamber within the housing.

2. The door closer of claim 1, further comprising a first bearing, coupled to the first gear shaft, and a second bearing, coupled to the second gear shaft,
   wherein the first and second spiral gears are substantially identical,
   the first spiral gear includes a first gear valve,
   the second spiral gear includes a second gear valve,
   the first spiral gear and the first gear shaft form a first monolithic component, and
   the second spiral gear and the second gear shaft form a second monolithic component.

3. The door closer of claim 1, wherein the first and second spiral gears are substantially identical.

4. The door closer of claim 1, further comprising a fluid connection valve along the fluid connection.

5. The door closer of claim 1, further comprising a first bearing, coupled to the first gear shaft, and a second bearing, coupled to the second gear shaft.

6. The door closer of claim 1, wherein the first spiral gear and the first gear shaft form a first monolithic component, and
   the second spiral gear and the second gear shaft form a second monolithic component.

7. The door closer of claim 1, wherein the first spiral gear includes a first gear valve comprising a ball, and
   the second spiral gear includes a second gear valve comprising a ball and a spring.

8. A door assembly, comprising:
   a door, and
   the door operator of claim 1,
   wherein the door is coupled to the first spiral gear.

9. The door assembly of claim 8, wherein the door closer is located within the door.

10. A door assembly, comprising:
    a door, and
    a door operator, comprising
      a housing,
      a first gear shaft, in the housing,
      a first spiral gear coupled to the first gear shaft, in the housing,
      a second gear shaft, in the housing,
      a second spiral gear coupled to the second gear shaft, in the housing,
      a fluid connection between a first chamber and a second chamber, and
      a hydraulic pump, in fluid connection with the first chamber and the second chamber,
    wherein the first spiral gear and the second spiral gear are coupled to define the first chamber and the second chamber within the housing, and
    the door is coupled to the first spiral gear.

11. The door assembly of claim 10, wherein the door operator further comprises an output shaft, coupled to the door and either the first gear shaft or the second gear shaft.

12. The door assembly of claim 10, wherein the door operator further comprises a first bearing, coupled to the first gear shaft, and a second bearing, coupled to the second gear shaft,
wherein the first and second spiral gears are substantially identical,
the first spiral gear includes a first gear valve,
the second spiral gear includes a second gear valve,
the first spiral gear and the first gear shaft form a first monolithic component, and
the second spiral gear and the second gear shaft form a second monolithic component.

13. The door assembly of claim 10, wherein the door operator is located within the door.

14. The door assembly of claim 10, wherein the first and second spiral gears are substantially identical.

15. The door assembly of claim 10, wherein the door operator further comprises a fluid connection valve along the fluid connection.

16. The door assembly of claim 10, wherein the door operator further comprises a first bearing, coupled to the first gear shaft, and a second bearing, coupled to the second gear shaft.

17. The door assembly of claim 10, wherein the first spiral gear and the first gear shaft form a first monolithic component, and
the second spiral gear and the second gear shaft form a second monolithic component.

18. A door assembly, comprising:
a door, and
a door operator, comprising
a first gear shaft,
a first spiral gear, coupled to the first gear shaft,
a second gear shaft,
a second spiral gear, coupled to the second gear shaft, and
an electric motor, coupled to the first gear shaft,
wherein the first spiral gear is coupled to the second spiral gear, and
the door is coupled to the first spiral gear.

19. The door assembly of claim 18, wherein the first and second spiral gears are substantially identical.

20. The door assembly of claim 18, wherein the door operator further comprises a first bearing, coupled to the first gear shaft, and a second bearing, coupled to the second gear shaft.

21. The door assembly of claim 18, wherein the door operator further comprises an output shaft, coupled to the door and the first gear shaft.

22. The door assembly of claim 18, wherein the first spiral gear and the first gear shaft form a first monolithic component, and
the second spiral gear and the second gear shaft form a second monolithic component.

23. The door assembly of claim 18, wherein the door operator further comprises a first bearing, coupled to the first gear shaft, and a second bearing, coupled to the second gear shaft,
the first and second spiral gears are substantially identical,
the first spiral gear and the first gear shaft form a first monolithic component, and
the second spiral gear and the second gear shaft form a second monolithic component.

24. The door assembly of claim 18, wherein the door operator is located within the door.

* * * * *